(12) United States Patent
Schmidt et al.

(10) Patent No.: US 8,777,018 B2
(45) Date of Patent: Jul. 15, 2014

(54) FILTER DEVICE

(75) Inventors: Harald Schmidt, Gondershausen (DE); Frank Jonigkeit, Boppard (DE)

(73) Assignee: ETS Trade S.a.r.l., Wasserbillig (LU)

( * ) Notice: Subject to any disclaimer, the term of this patent is extended or adjusted under 35 U.S.C. 154(b) by 802 days.

(21) Appl. No.: 12/430,531

(22) Filed: Apr. 27, 2009

(65) Prior Publication Data

US 2009/0277847 A1 Nov. 12, 2009

Related U.S. Application Data

(63) Continuation of application No. PCT/EP2007/009123, filed on Oct. 22, 2007.

(30) Foreign Application Priority Data

Oct. 25, 2006 (DE) .......................... 10 2006 050 127

(51) Int. Cl.
*B01D 33/50* (2006.01)
(52) U.S. Cl.
USPC ...... 210/409; 210/356; 210/497.01; 210/508; 210/510.1; 210/797
(58) Field of Classification Search
None
See application file for complete search history.

(56) References Cited

U.S. PATENT DOCUMENTS

| | | | |
|---|---|---|---|
| 2,591,198 A * | 4/1952 | Ringe | 55/294 |
| 3,363,771 A * | 1/1968 | Walters | 210/360.2 |
| 3,716,968 A * | 2/1973 | Mischke | 55/294 |
| 3,750,885 A * | 8/1973 | Fournier | 210/107 |
| 3,847,817 A * | 11/1974 | Jarman | 210/297 |
| 3,958,296 A * | 5/1976 | Fell | 15/304 |
| 4,297,209 A * | 10/1981 | DeVisser et al. | 210/107 |
| 4,417,596 A * | 11/1983 | Pahlen | 134/152 |
| 4,834,883 A * | 5/1989 | Lake | 210/332 |
| 4,923,601 A * | 5/1990 | Drori | 210/107 |
| 5,021,126 A * | 6/1991 | Gwin et al. | 162/263 |

(Continued)

FOREIGN PATENT DOCUMENTS

| | | |
|---|---|---|
| DE | 11 63 292 B | 2/1964 |
| DE | 34 28 777 A1 | 2/1986 |

(Continued)

OTHER PUBLICATIONS

International Search Report dated Feb. 4, 2008, PCT/EP2007/009123.

(Continued)

*Primary Examiner* — Robert James Popovics
(74) *Attorney, Agent, or Firm* — Gifford, Krass, Sprinkle, Anderson & Citkowski, P.C.

(57) ABSTRACT

The present invention relates to a filtering device, facilitating the filtration of media to be cleaned, and also the cleaning of the filter material or filter elements in a filtering device. Said filtering device comprises at least one filter element arranged in a housing, with at least one filter material and at least one rebound element. The invention further relates to a cleaning device, comprising at least one nozzle, which is arranged perpendicularly and/or angularly in relation to the filter element for removing a filter cake on the filter material, wherein the cleaning medium at least partially penetrates the filter material during cleaning. The rebound element deflects the cleaning medium at least partially for renewed penetration through the filter material, while at least partially removing the filter cake at the same time.

4 Claims, 17 Drawing Sheets

(56) References Cited

U.S. PATENT DOCUMENTS

| | | | | |
|---|---|---|---|---|
| 5,112,481 A * | 5/1992 | Drori | | 210/193 |
| 5,128,038 A * | 7/1992 | Slavitschek et al. | | 210/323.2 |
| 5,173,186 A * | 12/1992 | Spafford et al. | | 210/455 |
| 5,176,826 A * | 1/1993 | Rosaen | | 210/232 |
| 5,203,998 A * | 4/1993 | Benian | | 210/493.5 |
| 5,227,048 A * | 7/1993 | Seibel et al. | | 210/94 |
| 5,268,095 A * | 12/1993 | Barzuza | | 210/143 |
| 5,292,074 A * | 3/1994 | Clark et al. | | 239/546 |
| 5,328,604 A * | 7/1994 | Drori | | 210/232 |
| 5,376,268 A * | 12/1994 | Ikeda | | 210/383 |
| 5,387,339 A * | 2/1995 | Lee et al. | | 210/326 |
| 5,444,892 A * | 8/1995 | Ris et al. | | 15/304 |
| 5,510,029 A * | 4/1996 | Benian | | 210/333.01 |
| 5,514,270 A * | 5/1996 | Barzuza | | 210/356 |
| 5,516,426 A * | 5/1996 | Hull et al. | | 210/256 |
| 5,554,284 A * | 9/1996 | Bartelt et al. | | 210/356 |
| 5,565,012 A * | 10/1996 | Buodd | | 55/294 |
| 5,595,655 A * | 1/1997 | Steiner et al. | | 210/391 |
| 5,667,683 A * | 9/1997 | Benian | | 210/409 |
| 5,799,612 A * | 9/1998 | Page | | 119/260 |
| 5,882,529 A * | 3/1999 | Gupta | | 210/784 |
| 5,989,419 A * | 11/1999 | Dudley et al. | | 210/167.14 |
| 6,152,155 A * | 11/2000 | Milligan | | 134/138 |
| 6,156,213 A * | 12/2000 | Dudley et al. | | 210/791 |
| 6,267,879 B1 * | 7/2001 | Gil | | 210/107 |
| 6,463,943 B1 * | 10/2002 | Monroe | | 134/152 |
| 6,497,814 B1 * | 12/2002 | Alexander et al. | | 210/108 |
| 6,676,834 B1 * | 1/2004 | Benenson et al. | | 210/323.2 |
| 6,977,040 B2 * | 12/2005 | McCune et al. | | 210/248 |
| 7,055,699 B2 | 6/2006 | Takatsuka | | |
| 7,311,823 B2 * | 12/2007 | Brooke | | 210/167.14 |
| 7,828,963 B1 * | 11/2010 | Neibert et al. | | 210/167.12 |
| 7,828,964 B1 * | 11/2010 | Neibert | | 210/167.12 |
| 8,012,359 B2 * | 9/2011 | Parkinson | | 210/786 |
| 8,101,090 B2 * | 1/2012 | Ralvert | | 210/797 |
| 8,297,447 B2 * | 10/2012 | Sorenson et al. | | 210/411 |
| 8,377,291 B2 * | 2/2013 | Eckman | | 210/86 |
| 8,444,862 B2 * | 5/2013 | Ralvert | | 210/780 |
| 8,524,075 B1 * | 9/2013 | Quintel | | 210/108 |
| 2002/0008068 A1 * | 1/2002 | Anderson | | 210/741 |
| 2002/0011259 A1 * | 1/2002 | Pociask | | 134/34 |
| 2002/0130092 A1 * | 9/2002 | McCune et al. | | 210/791 |
| 2002/0189988 A1 * | 12/2002 | Alexander et al. | | 210/169 |
| 2004/0047675 A1 * | 3/2004 | Bonelli et al. | | 401/289 |
| 2006/0060544 A1 * | 3/2006 | Brooke | | 210/791 |
| 2009/0050582 A1 * | 2/2009 | Gil | | 210/798 |
| 2009/0277847 A1 * | 11/2009 | Schmidt et al. | | 210/785 |
| 2010/0032388 A1 * | 2/2010 | Ralvert | | 210/797 |

FOREIGN PATENT DOCUMENTS

| | | | | |
|---|---|---|---|---|
| DE | 42 39 664 A1 | 6/1994 | | |
| DE | 101 96 096 T1 | 11/2001 | | |
| DE | 10 2006 012 919 A1 | 3/2006 | | |
| DE | 102006050127 A1 * | 4/2008 | | B01D 29/05 |
| EP | 0 247 445 A | 12/1987 | | |
| EP | 0623372 A1 | 11/1994 | | |
| WO | WO-89/04204 | 5/1989 | | |
| WO | 2006008729 A1 | 1/2006 | | |

OTHER PUBLICATIONS

International Preliminary Report PCT/EP2007/009123.

* cited by examiner

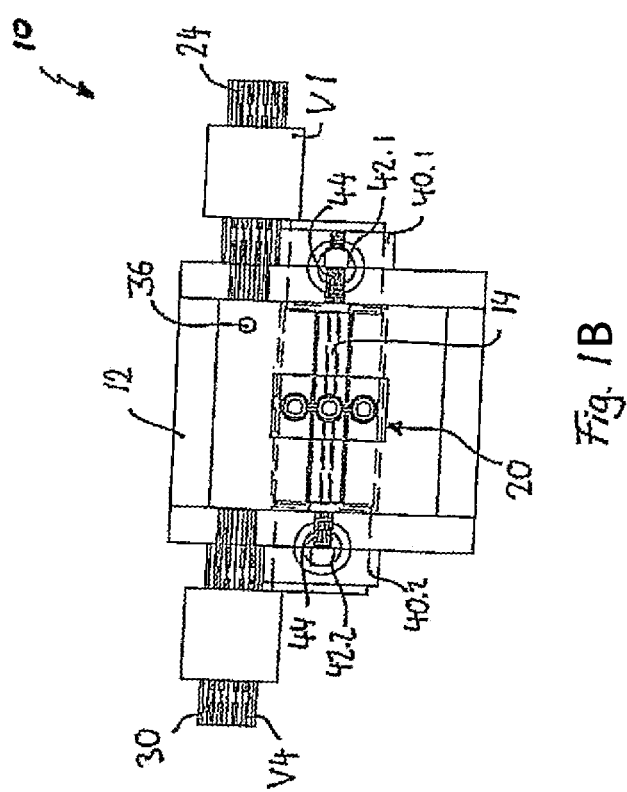

FILTER DEVICE

CROSS-REFERENCE TO RELATED APPLICATIONS

This application is a continuation of PCT/EP2007/009123 filed on Oct. 22, 2007, which claims priority to German Patent Application DE 10 2006 050 127.6 filed on Oct. 25, 2006.

FIELD OF THE INVENTION

The present invention relates to a filtering device for cleaning particularly a liquid and/or gaseous medium as well as to a filter element that can be inserted in this filtering device and also to a method for cleaning a medium and to a method for removing a filter cake that has become deposited in the filtering device according to the invention.

BACKGROUND OF THE INVENTION

Many different filtering devices for cleaning liquid and/or gaseous media or corresponding mixtures, including also high-viscosity and oily media, are known from the state of the art. A particularly problematic aspect of the filtering devices that are known from the state of the art is the removal of the filter cake that becomes deposited on a filter element contained in the device, or mud collected there. On this subject, U.S. Pat. No. 7,055,699 B2 proposes a self cleaning mechanical filter, where a cleaning device is integrated in the filtering device disclosed there and presents suction and washing nozzles that are arranged opposite each other, and where the suction nozzles rest directly against the filter element, and the suction nozzles and the washing nozzles are moved synchronously in the axial and radial direction for removal of the filter cake. The cleaning of the filtering device that is disclosed in U.S. Pat. No. 7,055,699 B2 is very complicated and requires complex control. In addition, because of the movement in both the axial and also the radial direction, a relatively high mechanical driving force needs to be applied, which makes the filtering device disclosed there relatively costly.

Moreover, a filtering device according to the preamble is disclosed in WO 2006/008729, where, for the removal of a filter cake on a filter element in a filtering device, a cleaning head with a nozzle is defined particularly, which rests directly against the filter element, and through which, due to a pressure difference that builds up during the cleaning, the filter cake is sucked off the filter element. For the filtering device that is disclosed there to work properly, it is, however, always necessary to guide the cleaning head of the cleaning device so that it rests directly against the filter element, with the result that the pressure difference that can be generated for cleaning is insufficient in the case of slight unevenness that develops particularly in the filter elements or their surfaces in the case of prolonged use of the filtering device.

The problem of the present invention therefore is to make available a filtering device whose filter material or whose filter element(s) can be cleaned particularly well and simply due to the construction of the device, and which in addition effectively cleans a medium to be cleaned, regardless of whether the latter is gaseous, liquid or a mixture that may be of any type.

SUMMARY OF THE INVENTION

This problem is solved by a filtering device with a housing with at least one filter element arranged in it, comprising at least one filter material and at least one rebound element, and with a cleaning device, comprising at least one nozzle, which can be directed, for the removal of a filter cake, on the filter material by means of a cleaning medium perpendicularly and/or angularly in relation to the filter element, where, for the cleaning, the cleaning medium at least partially penetrates the filter material, and the rebound element deflects the cleaning medium at least partially for the renewed passage through the filter material, with at least partial removal of the filter cake at the same time. Advantageously, exactly one nozzle or nozzle block is associated with one filter element.

The filtering device according to the invention presents the great advantage that, due to the specific design of the filter element with at least one rebound element, a very effective removal of the filter cake that is being deposited on at least one filter material occurs, where suction nozzles that are known from the state of the art mentioned in the introduction are provided at the same time. The filtering device according to the invention can therefore be manufactured considerably more cost effectively, while the same good cleaning performance is achieved and also a more effective removal of the filter cake. Due to the feeding of the cleaning medium through the at least one nozzle perpendicularly and/or angularly in relation to the filter element, an individual and effective removal of the filter cake can occur, which is adapted to the specific properties of the medium to be cleaned, and takes into account the overall construction of the filtering device. The at least one nozzle can here be designed particularly so it is also movable and/or individually controllable. It is preferable for the cleaning device to present at least one nozzle row or else a nozzle field. Each of the individual nozzles of such a nozzle row or nozzle field design can here be designed to be movable, and it can be controlled separately; however, any desired combinations including fixed nozzles or consisting exclusively of fixed nozzles are conceivable. Here, the nozzles are directed perpendicularly on the filter element, the cleaning medium impacts perpendicularly on at least one filter material of the filter element, penetrating through the latter, where subsequently the cleaning medium is then reflected by the surface of the rebound element by approximately 180 degrees, as a function of the filter material used and its deflection of the cleaning medium as well as of the surface of the rebound element, where subsequently the cleaning medium then again penetrates through the filter material, clearing the filter cake at least partially or rinsing mud at least partially out of the filter element.

In an alternative embodiment for this, the nozzles are oriented at an angle of preferably approximately 5 to approximately 85 degrees, in relation to the filter element or its surface, so that the cleaning medium impacts the filter material of the filter element at a corresponding angle, penetrates through the filter material, and then is reflected from the surface of the rebound element at an angle that corresponds more or less to the rebound angle, as a function of the filter material used. The cleaning medium that has been reflected in this way again penetrates through the filter material, and it removes the mud or filter cake, which has been collected up or has deposited on or in the filter material of the filter element. Such an angular arrangement of the nozzles with respect to the surface of the filter element is particularly advantageous when the cleaning device is designed to be movable in a preferred embodiment, so that, in the direction of movement, the cleaning medium can be fed on the filter element and the filter material angularly, which results particularly in facilitating, particularly in accelerating, the removal from the filtering device of the cleaning medium that has become contaminated with the protection [sic; mud] or filter cake.

In another alternative embodiment, the cleaning device can also present nozzles that are oriented both vertically and angularly in relation to the surface of a filter element, where, for example, in an arrangement in the form of a nozzle row, first a nozzle row can also be provided that feeds the cleaning material perpendicularly on the filter element, and subsequently a nozzle row that discharges the cleaning medium on the filter element angularly in relation to the surface of the filter element, and particularly in the direction of movement in the case of a movable cleaning device. Naturally, the reverse arrangement is also conceivable. All possible combinations of arrangements of nozzles in the cleaning device as well as their orientation in view of the filter element are in accordance with the invention.

The cleaning medium is released out of the nozzles of the cleaning device, preferably under pressure, here preferably at a pressure of more than 3 bar, and more preferably at a pressure of more than 5 bar. As a result, the cleaning effect is increased, and the cleaning step is accelerated.

It is preferable for the filter element of the filtering device to present a cylindrical and/or flat design. Here, the cleaning device can present particularly several, i.e., at least two filter elements with cylindrical and/or flat design. Flat filter elements can be arranged here particularly in one or more rows, while cylindrical filter elements can be accommodated preferably as an individual piece or in groups of two, three or four, or in groups of a multiple of the above-mentioned groups, in a filtering device. It is advantageous here for a nozzle, or a nozzle block to be associated with a filter element of cylindrical design, where it is preferable furthermore for the filter element to be designed so it can be moved. Flat pursuant to the present invention means that the filter elements can be designed, for example, as flat cuboids, which may be square or rectangular. Any other design of the filter element pursuant to the present invention is, however, also possible.

A partial area of a surface of the filter element can serve as a rebound element. This rebound element of the filter element of the filtering device can be designed as a rebound metal plate, particularly one presenting any conceivable shape that is adapted to the circumstances, for example, quadrangular, cylindrical or also spherical. The rebound element can here present openings for the passage of the cleaned filtrate. For example, a construction is conceivable in which the filter element presents a filter material, for example, nonwoven or yarn, which is pulled onto a simple frame structure, where, behind this filter material, the rebound element in the form of a metal plate is arranged. Such an arrangement can also occur spherically, for example, where the rebound element then comes to lie in the interior, or else outside the sphere defined by the filter element, where a cleaning of a medium to be cleaned can then occur from the inside toward the outside, or from the outside toward the inside, depending on the arrangement of the filter material and of the rebound element. If the filter material itself presents sufficient stiffness and rigidity, then a frame structure that carries the filter material and confers its shape to the latter can also be omitted. This can be the case, for example, when using sintered metal bodies as filter material.

Pursuant to the present invention, it is also possible to provide several rebound elements next to each other, one after the other, or partially overlapping. It is particularly preferable for the rebound element to be formed by a filter housing, which is at least partially enclosed or arranged partially with the at least one filter material. The filter housing itself can present, particularly in a head area and/or foot area of the same, outlets that are arranged for releasing the cleaned filtrate, flanges for the attachment in the interior of a filtering device to achieve a reliable securing in the latter, as well as other needed means and elements. For example, the rebound element can be formed by a flat solid block, particularly one made of a metal and/or plastic material, or of an at least partially hollow cylinder, where the flat block or else the cylinder can be open at one or else at both ends for the discharge of the cleaned filtrate. On the upper surface or the peripheral surface of the block or the cylinder, the filter material is then arranged, at least in partial areas of said surface. Moreover, in the filter housing that is formed from the block or cylinder, at least one opening is provided, through which the filtrate can enter into the interior and be released from the filtering device according to the invention through outlets that are associated with the head areas or the foot areas.

It is particularly preferable for the surface of the rebound element to present an at least partially structured design. By structuring the surface of the rebound element, advantageously, on the one hand, a simplified and particularly also accelerated outflow of the cleaned filtrate is achieved, particularly also in a directed way, toward openings that are provided on the filter element and, moreover, during the cleaning of the filtering device, the cleaning medium that impacts under pressure is also reflected or scattered at different angles, resulting in an increase in the cleaning effect. The structure of the surface of the rebound element can be of any conceivable design; for example, the surface can be simply embossed in the shape of a point or line, or its design can be wavy, for example. It is preferable for the surface to present a structure that is formed from at least two recesses that run parallel to each other, viewed in the direction of a longitudinal axis L of the rebound element. Between the recesses, it is preferable to arrange particularly rib-shaped embossments. The embossments, if of linear design, can also present gaps, so that the medium to be cleaned can move from one recess to the adjacent recess. The gaps can be offset with respect to adjacent embossments or arranged without offset. In particular, embossments can also be arranged in such a way on the surface of the rebound element that continuous linear, particularly rib-shaped, embossments alternate with embossments interrupted with gaps. The filter material is in contact with the embossments, so that the filtrate can be led through the recesses to openings, and be released. The recesses are designed preferably as grooves, which end shortly before or at the head area and/or foot area of the rebound element, particularly in the case of a design as a filter housing. The grooves can here present a uniform depth or a varying depth over their entire length; for example, they may also present an incline particularly toward an opening. In the recesses, openings can be provided, preferably at least two for each recess.

In an additional preferred embodiment, the surface structure of the rebound element presents at least one recess that runs diagonally to the longitudinal axis L, and which is also designed preferably as a groove. Here, recesses that run diagonally can also be combined with recesses that run parallel. The recesses are here preferably distributed uniformly over the entire surface of the rebound element that is covered with the filter material. If only a part of the rebound element is enclosed with a filter material, corresponding structures need to be applied only in the area of the application of the filter material.

In a flat or block-like design of the rebound element in the form of a filter housing, it is preferable here for the at least one recess that is arranged diagonally to the longitudinal axis L to end in the immediate vicinity or in the head area and/or foot area of the filter housing. The opposite end of the corresponding diagonally running recesses can here end in a longitudinal side of the flat, block-like filter housing. Accordingly, the diagonally running recesses can be arranged on a cylindrically designed filter body. The diagonally running recesses can here present a rectilinear design, but they can also present a radial, for example, quadrant, shape. However, any other design of the recess that runs at least in partial areas diagonally, i.e., angularly, in relation to the longitudinal axis L, is advantageous pursuant to the present invention. If the diagonally running recesses end in the vicinity or in the head area and/or foot area of the rebound element, openings should preferably be provided there for the passage of the cleaned filtrate, because here, due to the specific surface structure of the rebound element, the filtrate is transported through the recesses on the opening(s). The openings can be point-shaped, circular, slit-shaped, or of any other design. It is also possible in particular to arrange openings that are also distributed over the remaining surface of the rebound element, particularly in the recesses of the surface of the rebound element.

Depending on the design of the rebound element, the latter can present an at least partially structured surface on one side, or also on both sides. In a flat, block-like design or a cylindrical design of the rebound element, particularly as a part of a filter housing, it is preferable to provide the entire surface in a cylindrically designed rebound element, or both sides in a flat, block-like rebound element, with a surface structure in the area of the adjacent filter material.

The filter material is chosen preferably from a group comprising nonwovens, fibers, fabrics, yarns and/or sintered metal bodies. Here it is also particularly possible to provide combinations of different filter materials, including for the generation of a filtration gradient in the filter element. In particular, sintered metal bodies with an integrated gradient pattern and manufactured from mixtures of sintered metal powders and sintered metal fibers, including with inserted fabric structures, etc., can also be used. It is preferable, pursuant to the present invention, to use as filter material a yarn that consists of one or more fine/thin individual filaments. It is preferable to use at least a yarn as filter material, because, during the filtration and cleaning process, the yarns vibrate, and as a result they support the filtration, on the one hand, and also the cleaning due to a facilitated removal of the filter cake. The yarn preferably presents a textured design, which allows considerably more soiling particles to be caught. It is preferable for the individual elements of the yarn to present a diameter of up to approximately 1 mm, preferably up to approximately 0.5 mm, and even more preferably approximately to 0.01 mm. The yarn as well as other filter materials are used here preferably in at least two, and more preferably in more than two, layers. In this way, very fine filtrates can be obtained, regardless of whether they are gaseous or liquid. The cleaning device according to the invention connects the mode of operation of an edge cleaning filter with that of a depth filter.

It is preferable for the cleaning device to present a sled-type design. The cleaning process comprises the at least one nozzle, which is arranged preferably on a nozzle block. In this nozzle block, several nozzles can be arranged, including particularly together in a nozzle row, and also as a nozzle field. A sled-type design of the cleaning device is advantageous particularly in a flat design of the filter element for the filtering device. Otherwise the cleaning device can also comprise a cylindrically designed nozzle block with nozzles arranged on it. The cleaning device can be driven here preferably hydraulically, electrically or mechanically, or via a gearing, for example, a worm gear. Alternatively, one can also provide for the cleaning device to present a stationary design, and the filter elements are moved. This is particularly advantageous with a cylindrical design of the filter elements. It is preferable to associate at least one nozzle with each individual filter element housed in the housing. As a result, the cleaning performance can be increased further. Here it is particularly advantageous, in the case of flat filter elements, for a nozzle block, particularly one with a nozzle row, to be associated with each side of the filter element that is provided with the filter material. Alternatively, the nozzle blocks can also present, in the case of filter elements that are arranged in several rows next to each other or in another arrangement, several nozzles that point in different directions, for the purpose particularly of cleaning several filter elements at the same time. In a flat filter element with filter material arranged on both sides, facing nozzle blocks, which extend over the entire longitudinal direction of the filter material, can be associated with one or more filter elements, particularly in the case of filter elements arranged in several rows, and, during the cleaning of the filter element(s) for removing the filter cake or the mud, they can be moved on or in them over the entire surface of one or more filter elements. One can also provide for at least two filter elements to be associated with at least one nozzle. This may be the case, for example, if the nozzle block with the at least one nozzle has a design that allows rotation, particularly in the case of the use of cylindrical filter elements, or if the filter elements themselves present a design that allows rotation.

If the filter element presents a cylindrical design, then it is preferable for the filter elements to be movable, and for the cleaning device in the form of a cylindrical nozzle block with arranged nozzle to be stationary, where the latter device can also present a design that allows rotation. For example, if four filter elements in a group are arranged together on an approximately square base area, then a cylindrically designed nozzle block can be arranged in the middle between them and present a respective nozzle row that is directed onto each of the four filter elements. By the rotation of the filter elements, for example, via a gearing, particularly a worm gear that is arranged in an outlet area, it is alternatively also possible to achieve in this way a cleaning of the entire surface of the filter material of a cylindrically designed filter element by pressurized air or hydraulically, for example, in the case of a stationary, cylindrical nozzle block. However, the nozzle block may also present only one nozzle row, and a design that allows rotation.

At least one opening in filter elements with cylindrical or flat design can be arranged at each position of the surface of the area that is covered with filter material, particularly also on a head area and/or foot area of the rebound element that is covered with filter material. The openings can present a design of any possible shape, for example, a round or an angular opening cross section, slit-shaped, etc.

The present invention relates moreover to a filter element that comprises at least one rebound element and at least one filter material, where the rebound element presents an at least partially structured surface. For the rest, the filter element according to the invention presents the advantageous embodiments that have already been represented above, particularly concerning the surface structure.

Moreover, the invention relates to a method for cleaning of a particularly gas and/or fluid medium, particularly in industrial installations, where the medium is cleaned at least partially by at least one filter element according to the invention with an at least partially structured surface on the rebound element of the same.

Finally, the present invention relates to a method for the removal of a filter cake that has become deposited or mud that has collected on at least one filter element, comprising at least one filter material and at least one rebound element in a filtering device, where, over at least one nozzle of a cleaning device, a cleaning medium is directed perpendicularly and/or angularly, in relation to a surface of the rebound element, on the filter element, the cleaning medium penetrates through the at least one filter material, rebounds at least partially on the rebound element, and, at the time of a renewed passage through the filter material, removes the filter cake at least partially. The terms filter cake and/or mud that becomes deposited on or in the filter element are synonymous terms pursuant to the present invention.

It is preferable for the cleaning device to be moved during the release of the cleaning medium; in an alternative embodiment, at the time of the release of the cleaning medium, the at least one filter element is moved. However, combinations of these two designs are also possible. The cleaning medium is here preferably a liquid and/or gaseous medium, and it can represent particularly also mixtures of liquid, gaseous or liquid and gaseous media. Here, the cleaning medium is chosen in view of the properties of the medium to be cleaned. It can be, for example, water, pressurized air, oxygen, ammonia, an aliphatic hydrocarbon or else a hydrocarbon mixture, gasoline or a similar substance. However, the preliminary and post cleaning medium is also chosen in view of the circumstances. In the case of the cleaning of a gaseous mixture by the filtering device, it is preferable to use a liquid cleaning medium, which rinses the filter cake/mud out of the filter material. In the case of the filtration of the liquid medium with the filtering device according to the invention, it is preferable to use the cleaned medium itself as cleaning medium.

Before feeding the cleaning medium, it is advantageous to rinse out the remaining medium to be cleaned that is still present in the housing of the filtering device with a preliminary cleaning medium. The preliminary cleaning medium can here be fed via an advantageously separate feed of the filtering device, and it can be released through an outlet through which the cleaning medium as well flows out of the filtering device. It can also be fed particularly advantageously under pressure into the filtering device, where, in the inlet, a valve is then provided advantageously, through which the pressure of the fed cleaning medium can be controlled precisely. Corresponding valves can also be provided at the inlet of the cleaning medium, and also of the medium to be cleaned, which can also be fed under pressure into the filtering device according to the invention. Similarly, the outlets for the cleaned filtrate and/or the cleaning or preliminary cleaning medium can also be provided with a preferably controllable valve. However, any other types of shutoff devices, for example, ball cocks or similar parts, are also conceivable. Due to the additional step of the feeding of a preliminary cleaning medium, the subsequent cleaning with the cleaning medium is advantageously temporally shortened. Moreover, it is advantageous to rinse out any remaining to cleaning medium [sic; medium to be cleaned] that is still present in the housing of the filtering device by means of a post cleaning medium. The feeding can here occur analogously to the feeding for the preliminary cleaning medium; however, additional feeds can also be provided. The preliminary and/or post cleaning medium can be in liquid or gaseous form, preferably gaseous, and here it may also represent a mixture of different gases.

When using a yarn-shaped or other material that is oriented in a preferential orientation, it is advantageous to apply the cleaning medium parallel to the winding or drawing direction of the filter material. This results in a highly efficient cleaning of the filtering device according to the invention.

The rebound effect and/or outflow of the cleaning medium is increased advantageously by the rebound element by structuring the surface of the latter. On this subject, reference is made to the explanations given above. The structured surface of the rebound element thus allows a facilitated and more rapid outflow of not only the cleaned filtrate but also of the cleaning medium and/or the preliminary cleaning medium.

BRIEF DESCRIPTION OF THE DRAWINGS

These and additional advantages of the present invention are explained in further detail below in reference to the following figures.

FIG. 1b: a side view of a head side of the filtering device according to FIG. 1a with partial sections;

FIG. 2: a partially broken open perspective view of the filtering device according to FIG. 1a;

FIG. 3: an additional broken open perspective view of the filtering device according to FIG. 1a;

FIG. 6a: a partially broken open perspective view of the filtering device according to FIG. 1a in a starting cleaning position;

FIG. 6b: a view of the head side of the partially broken open filtering device according to FIG. 6a;

DETAILED DESCRIPTION OF THE INVENTION

Figure 1A:
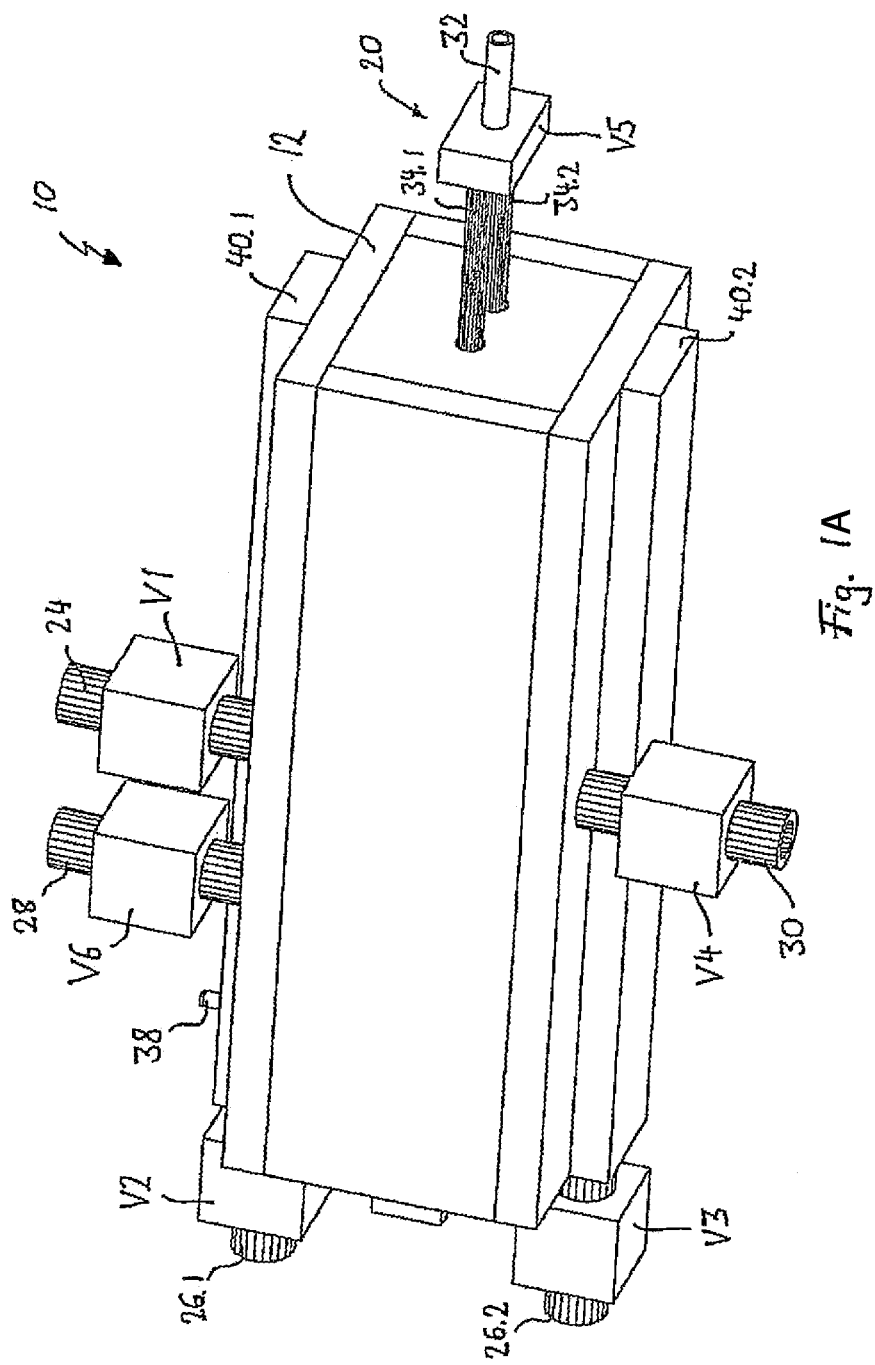
FIG. 1a: a perspective view of a filtering device according to the invention.

First, it must be stated beforehand that the characteristics shown in the figures are not limited to the individual embodiment. Rather, the characteristics that are indicated in each case in the description, including the description of the figures, and the drawing, can be combined to produce variants. In particular, the object of the present invention is not limited to the number of filter elements that are arranged in a housing in the filtering device according to the invention, or else with regard to the arrangement of the openings for the passage of the cleaned filtrate into the filter elements.

FIG. 1a shows a filtering device according to the invention, which overall bears a reference character 10, with a housing 12, which presents an approximately cuboid-shaped design. This housing 12 presents an inlet 24 with a valve V1 for the feeding of a medium to be cleaned and corresponding outlets 26.1 and 26.2 with valves V2 and V3 that are associated with them. Moreover, the filtering device 10 presents an inlet 28 with a valve V6 that is associated with it, and serves for the introduction of a preliminary cleaning medium, and a corresponding associated outlet 30 with a valve V4 that is associated with it. Finally, via a feed 32 and a valve V5 that is associated with it, a cleaning medium is fed into the filtering device via the feed lines 34.1 and 34.2 of the filter, where this cleaning medium can be released through the outlet 30 out of the housing 12 of the filtering device 10. Moreover, in FIG. 1a, a pressure sensor 38 can be seen, which is connected to a filtrate receiving element 40.1. The filtrate receiving element 40.1 is arranged on a longitudinal side of the housing 12 of the filtering device 10, and correspondingly with the former element, an additional filtrate receiving element 40.2 is arranged on the opposite longitudinal side of the housing 12. These filtrate receiving elements 40 are connected to the filter element, which is not represented in FIG. 1a, in the interior of the housing 12, and they present a channel, not represented here, in which the pressure sensor 38 engages.

This construction of the filtrate receiving elements 40.1 and 40.2 can be seen particularly in FIG. 1b. There, the arrangement of a filter element 14 with outlets 44 on its two front sides can be seen. The filter element 14 here presents a flat and block-like design. The outlets 44 end in the filtrate channels 42.1 and 42.2 that are arranged in the filtrate receiving elements 40.1 and 40.2. Moreover, in FIG. 1b, an additional pressure sensor 36 can be seen, which measures the pressure of a medium to be cleaned that flows into the housing 12 and is fed via the feed 24. By measuring the pressure difference between the pressure sensors 36 and 38 in case of soiling of the filter element 14, and in the case where a predetermined target value is reached, the feed of the medium to be cleaned is stopped by the valve V1, and then the cleaning process, which is explained below, can be started. The cleaning process can in principle also be started at any time with/without existing pressure difference pursuant to the present invention.

Figure 2:
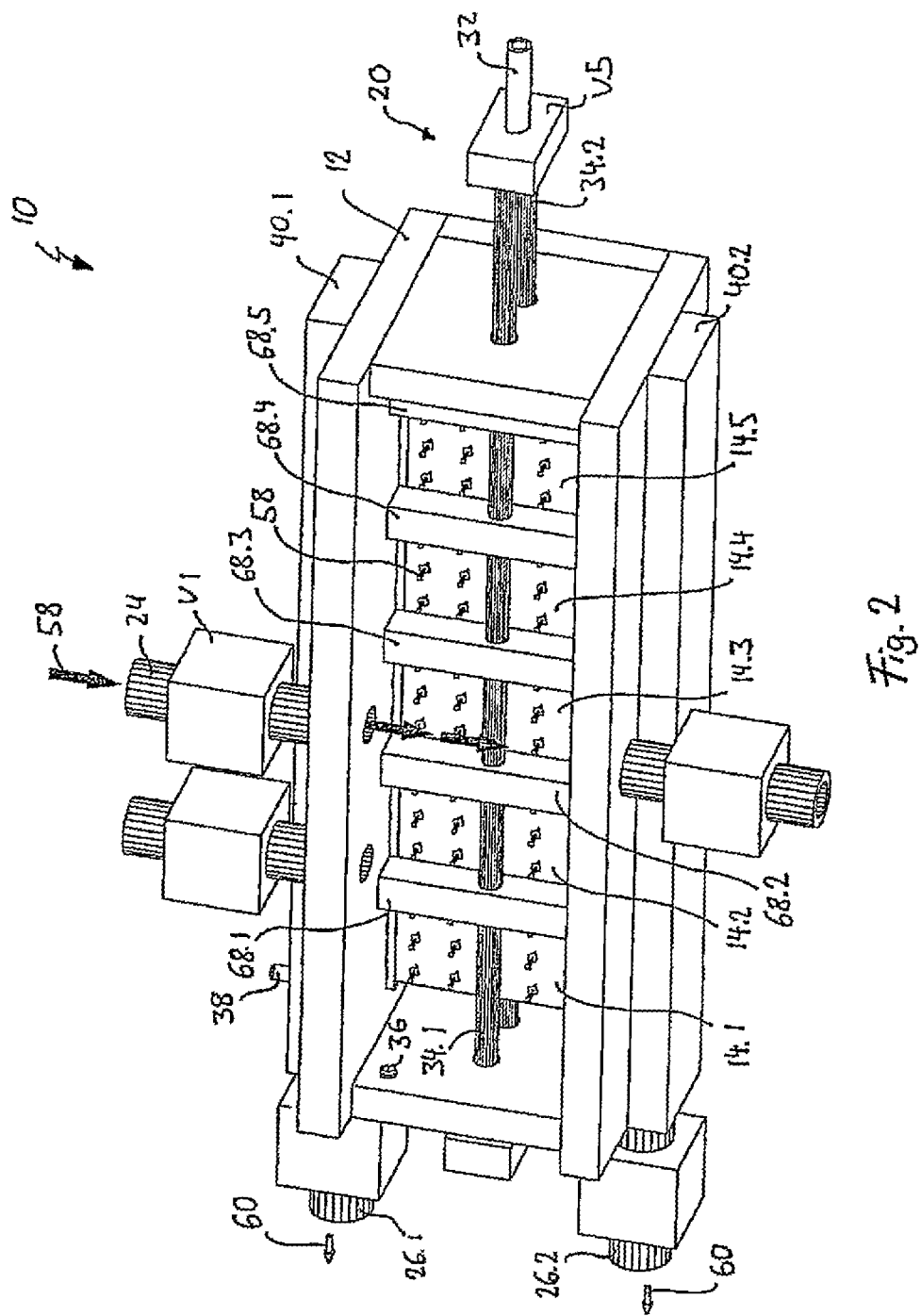

FIG. 2 shows a partially broken open perspective view of the filtering device 10 according to FIG. 1a, where one can see clearly that the arrangement of a total of five filter elements 14.1, 14.2, 14.3, 14.4 and 14.5 in a row also comprises the design of a cleaning device 20, which comprises the feed line 32, the valve V5, the feed lines 34.1 and 34.2 for the cleaning agent as well as the nozzle blocks 68.1, 68.2, 68.3, 68.4 and 68.5 that are arranged on the feed line 34.1. These nozzle blocks are arranged correspondingly on the opposite side of the filter elements 14.1-14.5 on the feed line 34.2. The nozzle blocks 68 thus present a paired arrangement and association in each case with one predetermined filter element 14. Thereby, the nozzle block 68 can also present, for example, in the case of filter elements 14 that are arranged in rows next to each other, nozzles oriented in several directions, so that a nozzle block can clean several filter elements at the same time. The filter elements 14.1-14.5 are enclosed here on both sides with a filter material, preferably a textured yarn consisting of one or more very thin individual filaments, preferably in several layers.

FIG. 2 shows the feed of the medium 58 to be cleaned, indicated by several black arrows, via the feed 24 and the valve V1 into the interior of the housing 12 of the filtering device 10. The medium 58 to be cleaned here penetrates into the filter elements 14.1 and 14.5 through the filter material that is arranged on the elements, and, in the end, it is led via the channels 42.1 and 42.2, which are arranged in the filter receiving elements 40.1 and 40.2, to the outlets 26.1 and 26.2, from which the cleaned filtrate 60 is then removed from the filtering device 10.

Figure 3:
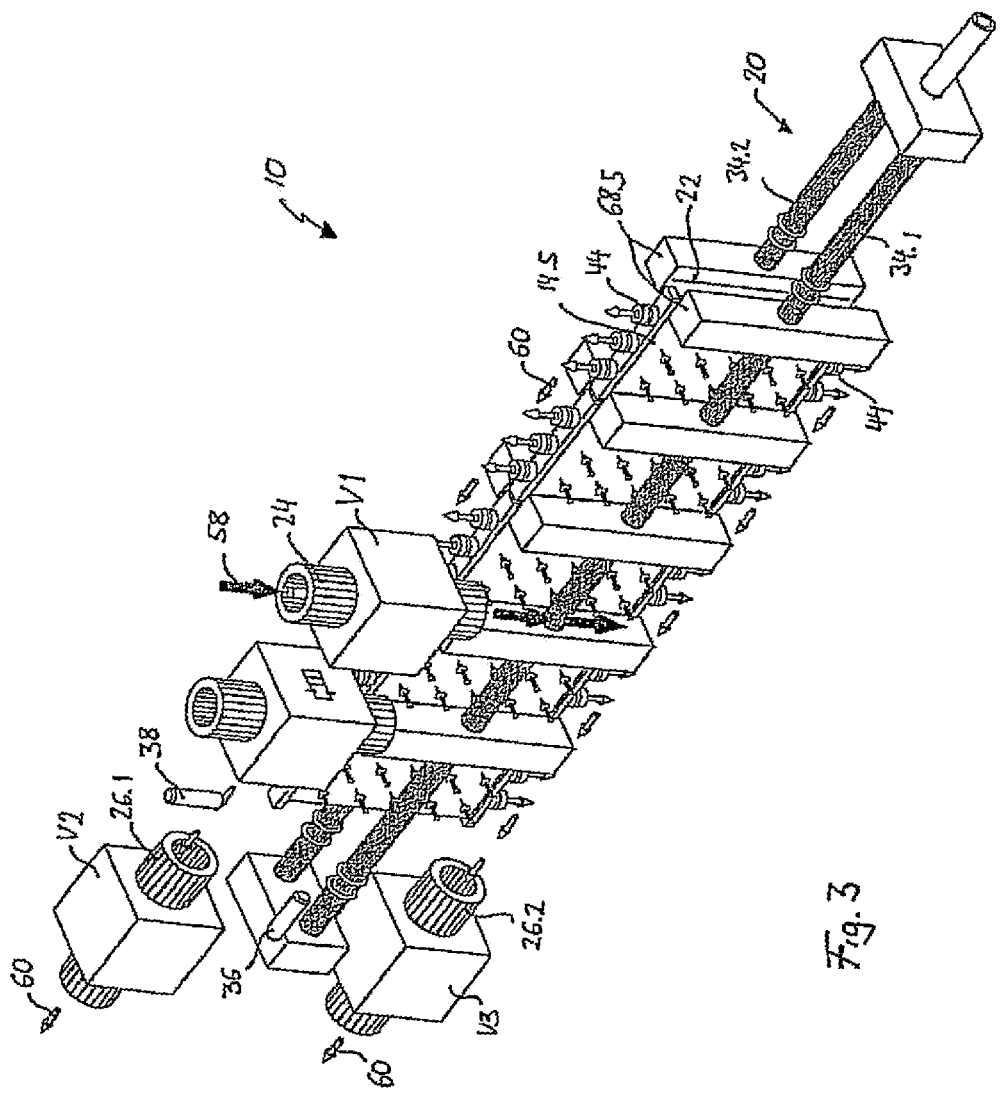

The paired arrangement of these blocks 68 can be seen in greater detail in FIG. 3, where the arrangement will be described in greater detail here with a view to the filter element 14.5 and the nozzle block pair 68.5. The filter elements 14.1-14.4 or the nozzle block pairs 68.1-68.4 present corresponding designs. FIG. 3 is the arrangement of a nozzle row 22 with a plurality of fixed and/or movable nozzles, which release the cleaning medium perpendicularly or angularly in relation to the filter element 14. The blocks 68.5 present a cuboid-shaped design, and they extend in their longitudinal direction over the entire surface of the area of the filter element 14.5 that is enclosed with a filter material.

Figure 4:
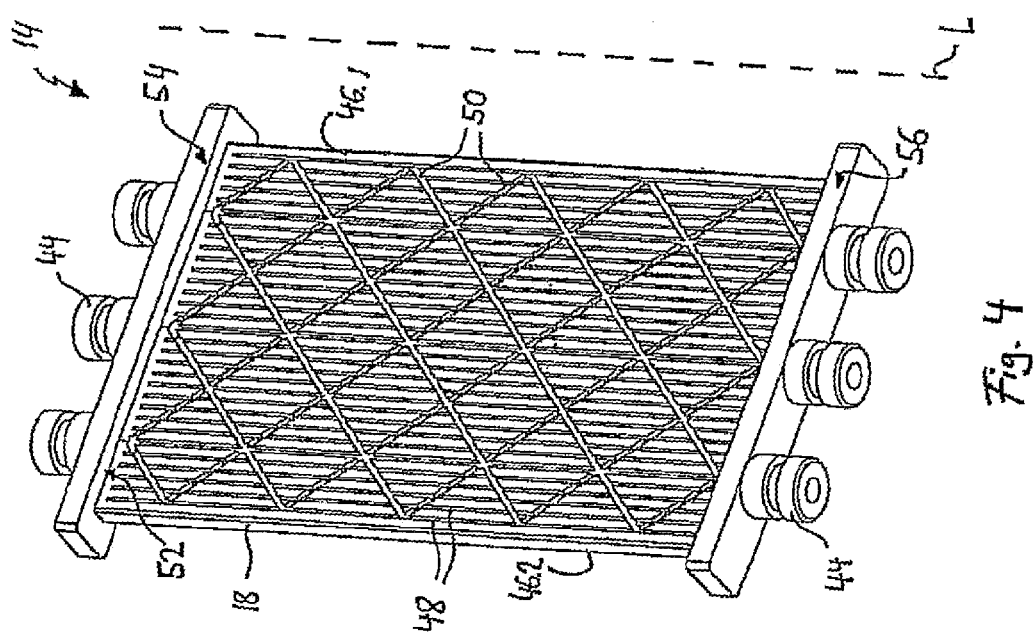
FIG. 4: a perspective view of a filter element without filter material.

FIG. 4 shows an individual filter element 14, without filter material, the like of which is accommodated five times in the filtering device according to FIG. 1a. The filter element 14 presents, in a head area 54 and a head [sic; foot] area 56, which present a flange-shaped design, three arranged outlets 44 in each case, through which cleaned filtrate is led to the channels 40.1 [sic; 42.1] and 40.2 [sic; 42.2], which are arranged in the filter receiving elements 40.1 and 40.2. The surfaces 46.1 of the front side and 46.2 of the back side of the flat, block-like filter elements 14 according to FIG. 4 present a structure where on said surfaces in each case a plurality of longitudinal recesses 48, presenting a groove design, is arranged, so that they run parallel to each other, and are intersected by diagonally running recesses 50. These diagonally running recesses 50 here are arranged in a rhombic pattern over the entire surface of the filter area 14 that is covered with a filter material, and accordingly they intersect the recesses 48 that run in parallel. The recesses 48 and 50 terminate in each case in the head area 54 or the foot area 56. The head area 54 and the foot area 56 present in each case a slit-shape opening 52, not shown in greater detail in FIG. 4, which extends over the entire width of the filter element 14, for receiving the cleaned filtrate that is fed through the structured surface via the recesses 48 and 50 of these slit-shaped openings 52. The rebound element 18 of the filter element 14 here is designed as a solid filter-housing body; in the flange-shaped design of the head area 54 and of the foot area 56, corresponding hollow cavities or channels are provided, through which the cleaned filtrate is led to the outlets 44. However, the opening 52 can also present any other type of design, in particular, several openings 52 can also be distributed over the entire surface of the rebound element 18. The openings 52 can be provided particularly in the recesses 48 and 50, where the rebound element 58 then presents a design that is hollow or else is provided with channels, so that the filtrate 60 that has been received through these openings can be led to the outlets 44.

Figure 5:
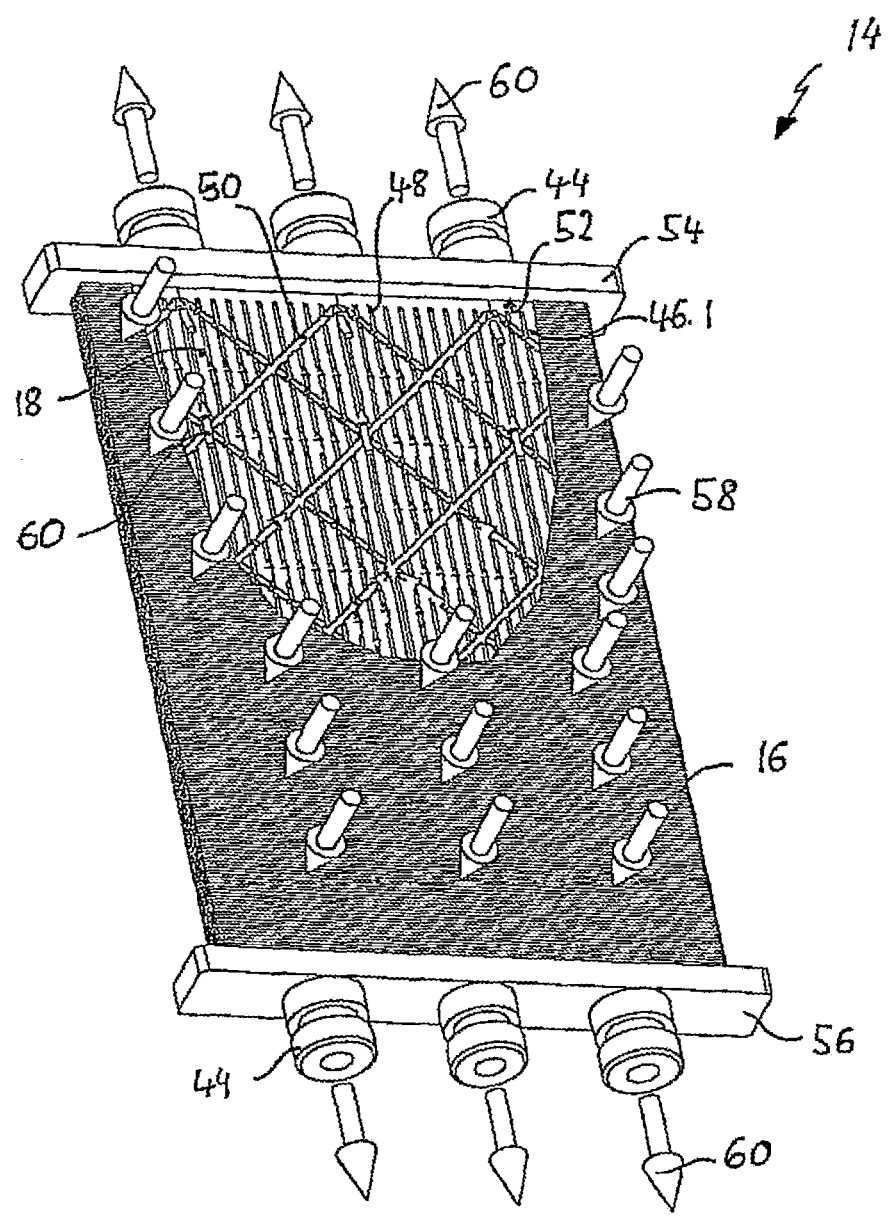
FIG. 5: a perspective, partially broken open view of a filter element according to the invention with filter material.
Figures 6A, 6B:
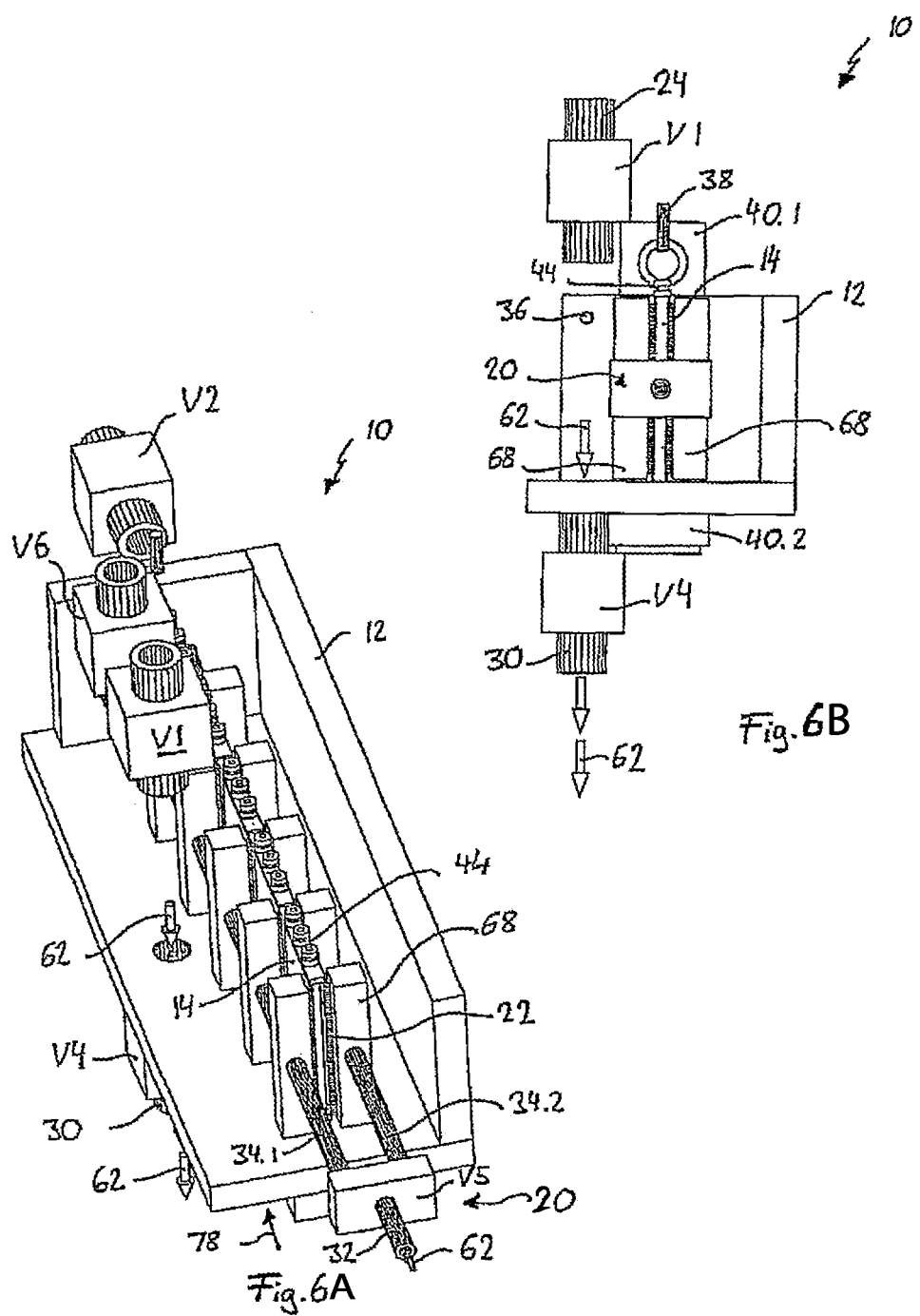

FIG. 5 now shows the mode of operation of the filter element 14, where in said figure the filter material 16 is also clearly visible in a partially broken open view. The latter material is designed as a fibrous yarn, and encloses the solid body of the rebound element 18. The medium to be cleaned 58, as illustrated by arrows that impact the filter element 14 from the outside) [sic], flows through the filter material 16 on the filter element 14, where the cleaned filtrate 60 that is illustrated by small arrows, is then led via the recesses 48 and 50 on the surface 46.1, and also on the surface 46.2 facing the former surface, to openings 52 that are arranged in the head area 54 and the foot area 56. The filtrate 60 that has thus been deflected by the surface 46.1 or 46.2 of the rebound element 18 leaves the filter element 14 through the outlets 44.

The functioning of the cleaning step of the filtering device 10 according to the invention is explained in greater detail in reference to FIGS. 6-9. FIG. 6a here shows a partially broken open view of the filtering device 10 according to FIG. 1a, where the cleaning device 20 is arranged in a starting position. The valves V1, V2, V3 and V6 are closed, and the valves V4 and V5 are opened. In FIG. 6a, the nozzle row 22 of the nozzle block 68 can be seen clearly, which is associated on the feed lines 34.1 and 34.2 in pairs with each filter element 14. The cleaning device 20 is designed as a sled, and it is movable in the direction of an arrow 78, but naturally also in the opposite direction to reach the starting position. The blocks 68 are, with respect to each one of the total five filter elements, in a starting position slightly in front of the longitudinal side of the filter element 14. The cleaning medium 62 is led through the feed 32, which is regulated by the valve V5, to the filtering device 10. In this position, the valves V1-V3, which are open in the filter process proper, have to be closed, and the same applies to the valve V6 that serves for feeding the preliminary cleaning medium. Only the valves V5 and V4 are open. The cleaning medium 62 that is mixed with mud/filter cake flows out of the housing 12 of the filtering device 10 via the valve V4 and the outlet 30. FIG. 6b shows, in a side view, the construction and the position of the cleaning device 20 according to FIG. 6a, and also the arrangement of the pressure sensors 36 and 38 as well as the construction of the filtrate receiving elements 40.

Figure 7:
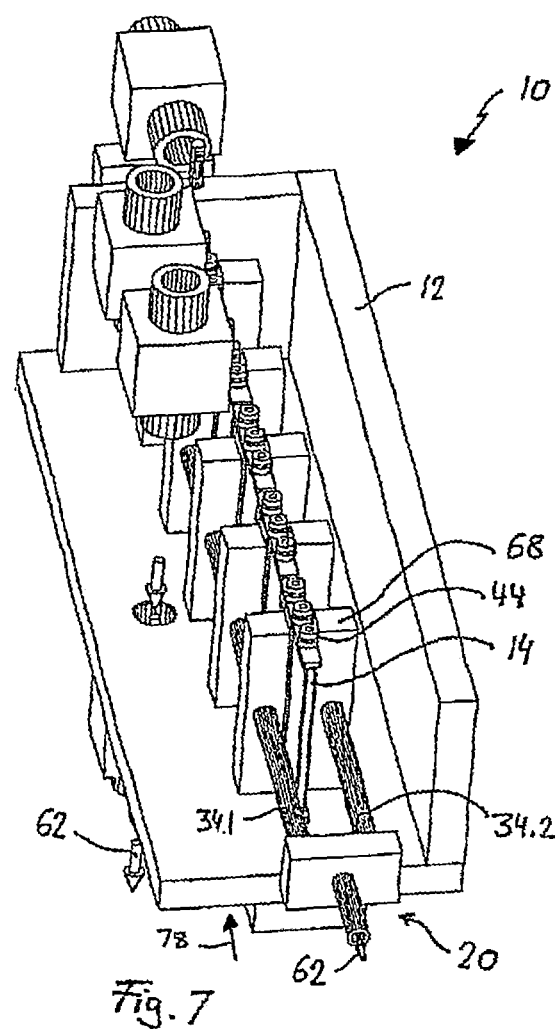
FIG. 7: the cleaning device according to FIG. 1a in a partially broken open view in a middle cleaning position.

FIG. 7 now shows the cleaning device 20, which is moved in the direction of the arrow 78, in a middle position, in which the nozzle blocks 68 that are arranged in both sides of the filter body 14 have reached approximately the middle of the filter element 14 at the height of the middle outlet 44.

Figure 8:
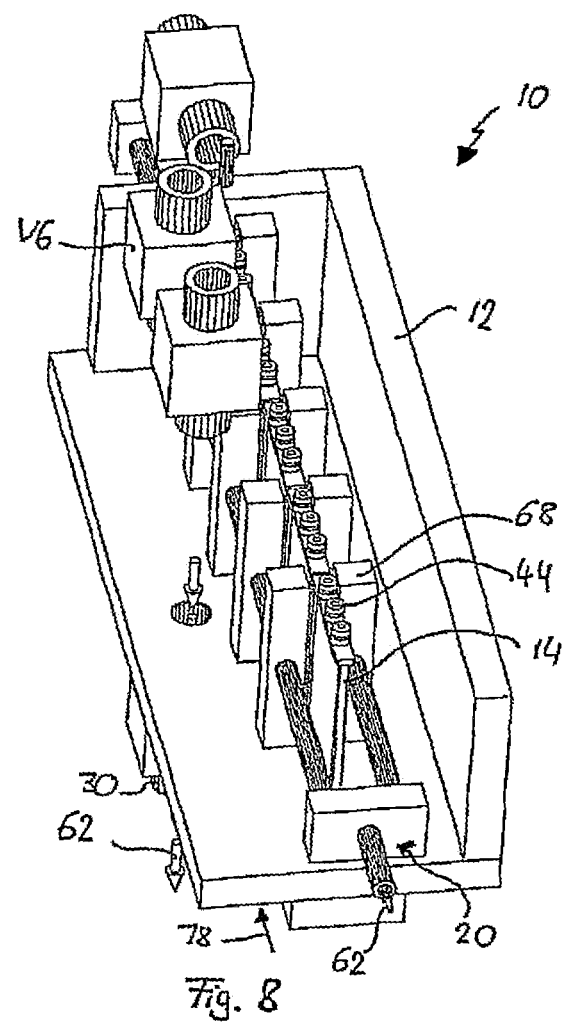
FIG. 8: the filtering device according to FIG. 1a in a partially broken open view in an end cleaning position.

In FIG. 8 one can see the end position of the cleaning device 20, in which the nozzle blocks 68 are finally moved over the entire lateral surface of the filter element 14, and assume their end position between the adjacent filter elements 14. All the cleaning medium 62 is removed through the outlet 30 of the filtering device 10. Optionally, preliminary cleaning medium, particularly gaseous preliminary cleaning medium, can be fed again via the valve V6 to the filtering device 10, to remove residues of the cleaning medium 62 from the filtering device 10. The cleaning device 20 could naturally also be designed so that only one nozzle block pair 68 is provided, which moves over all five filter elements 14 arranged in a row. However, as a result of the assignment of a total of five nozzle block pairs 68 to each filter element 14, a considerable acceleration of the cleaning is achieved. After the completion of the cleaning, the cleaning device 20 is moved again into the starting position according to FIG. 6a.

Figure 9:
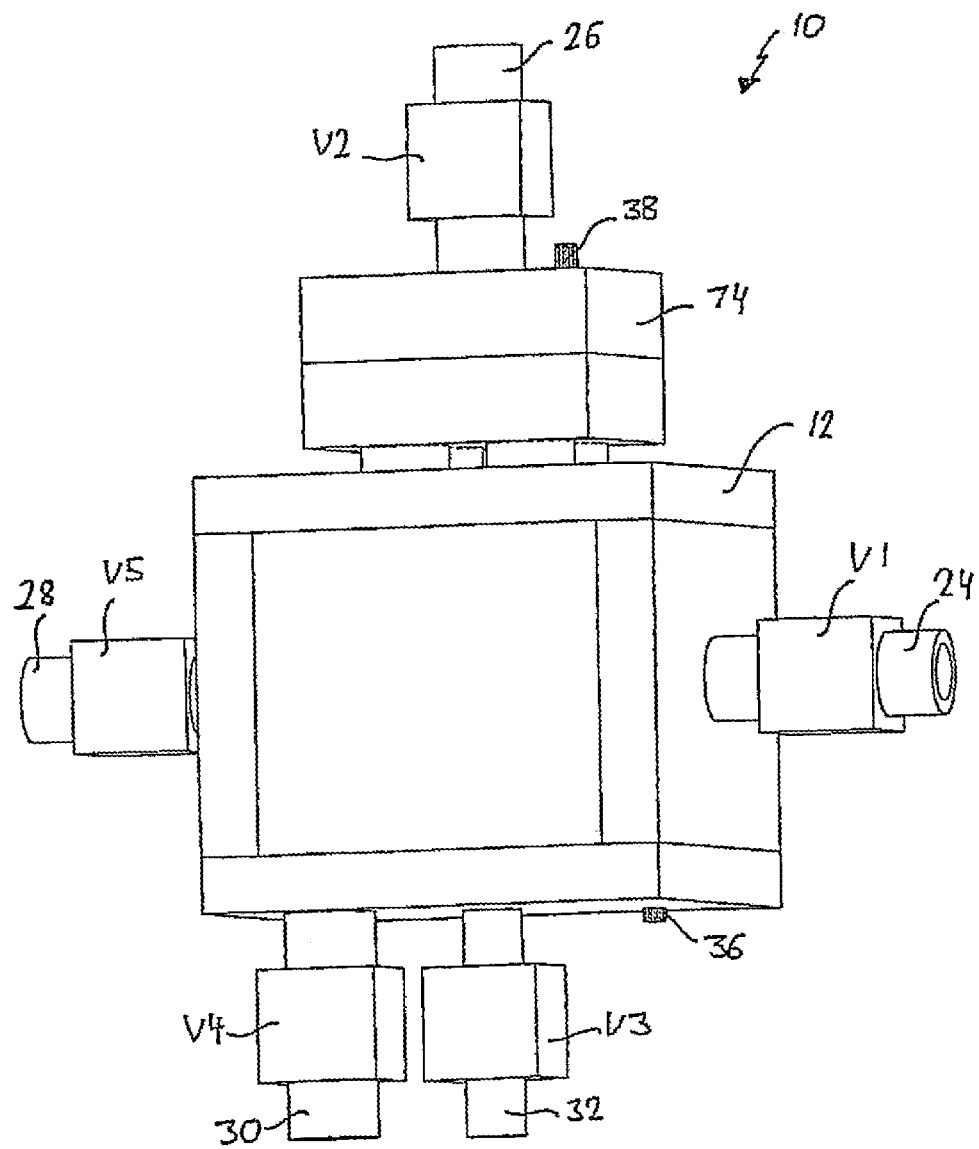
FIG. 9: an alternative embodiment of the filtering device according to the invention.

FIG. 9 now shows an alternative embodiment of the filtering device 10 according to the invention, which, in contrast to the one shown in FIG. 1a, does not present flat filter elements 14, but rather, as shown in FIGS. 10-15, presents cylindrically designed filter elements. As another difference compared to the filtering device shown in FIG. 1, the alternative embodiment shown in FIG. 9 presents only one outlet 26, which is provided with a valve V2, for the filtrate to be cleaned. Via the feed 32 and the valve V3 that is associated with it, cleaning medium can be fed to the device 10, and via the outlet 30 and the valve V4 that is associated with it, it can be removed. Through the inlet 28 and the valve V5 that is associated with it, preliminary cleaning medium can be fed to the device 10. Finally, in contrast with the filtering device according to FIG. 1a, the alternative embodiment shown in FIG. 9 presents a junction element 74, in which the cleaned filtrate to be removed from the total of four cylindrical filter elements 14 (see FIGS. 10-15) is united, and led to the outlet 26. However, each cylindrical filter element chosen can also be associated with its own outlet 26.

Figure 10A:
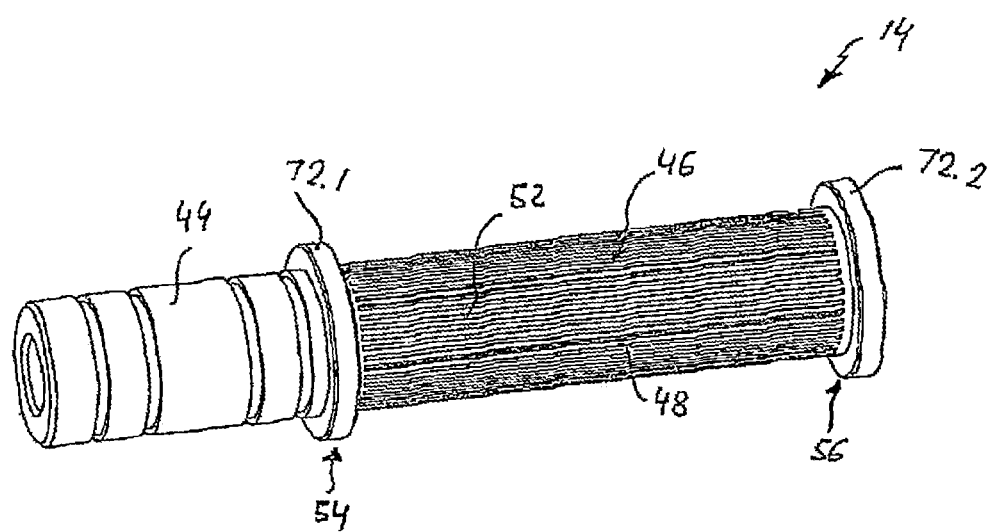
FIG. 10a: a cylindrically designed filter element according to the invention without filter material.

In FIG. 10a, the construction of the cylindrically designed filter element 14 shown without filter material can be seen. They present recesses 48 that are parallel and run in the longitudinal direction of the filter element 14 over the entire peripheral surface of the area of the filter element 14 that is to be covered with filter material, where, in the recesses 48, circular or angular openings 52 are arranged in the shape of a circle along the periphery of the cylindrical filter element 14, through which openings cleaned filtrate can enter into the interior of the cylindrical filter element 14. Alternatively, one could provide, for example, openings 52 on each end of the grooves 48 in question in the head area and/or foot area 54 or 56. A head area 54 presents a flange 72.1, and a foot area 56 presents a flange 72.2, by means of which the cylindrical filter element 14 is securely attachable in the device 10 according to FIG. 9. Moreover, the filter element 14 presents an outlet 44 for the cleaned filtrate.

Figure 10B:
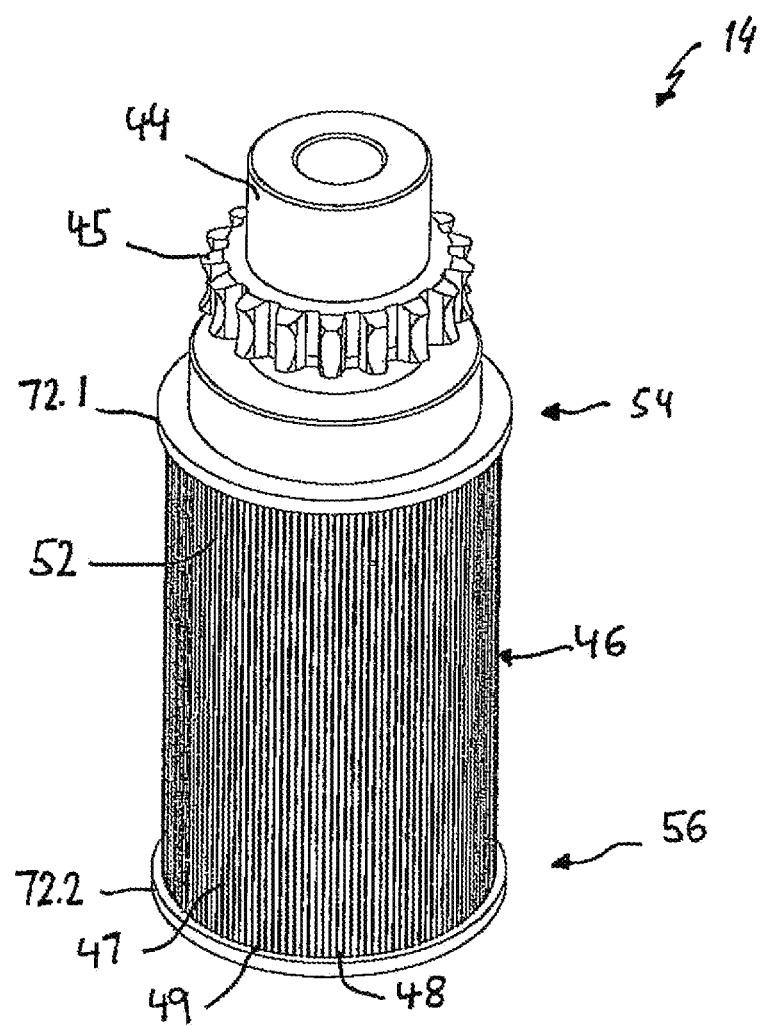
FIG. 10b: an alternative embodiment of a cylindrically designed filter element without filter material.

FIG. 10b shows an alternative embodiment of a cylindrically designed filter element 14 with respect to that shown in FIG. 10a, which again is represented here without filter material. The filter element 14 here presents particularly in addition a worm gear 45, through which the cylindrically designed filter element 14, during use, can be moved rotatably in a filtering device 10, as shown, for example, in FIG. 9, by means of appropriate engaging gear wheels, which are not shown. Moreover, a partial area of a surface 46 of the filter element 14 presents a structuring with recesses 48 and, between the latter, rib-shaped embossments 49 are arranged. The recesses 48 are here designed so that they start from a flange 72.1 in a head area 54 of the filter element 14 and run linearly to a second flange 72.2 in a foot area 56, and similarly the corresponding embossments 49. The embossments 49 are designed here in such a way that alternately embossments 49 are arranged that present gaps 47, in FIG. 10b, for example, three offset gaps 47 for each embossment 49 or four gaps 47 for each embossment 49, over the entire length between the flange 72.1 and 72.2. By means of these gaps 47, the filtrate can be led between adjacently arranged groove-shaped recesses 48. In the recesses 48, openings 52 are provided for the passage of the filtrate 52 [sic; 60] into the interior of the filter element 14. In the process, several, for example, six or a plurality of such openings 52 can be distributed over the entire area of the structured surface 46 in recesses 48. The openings 52 can also be arranged in the head area (flange 72.1) and/or the foot area (flange 72.2), for example, in the area of an extension of at least one recess 48.

Figure 11:
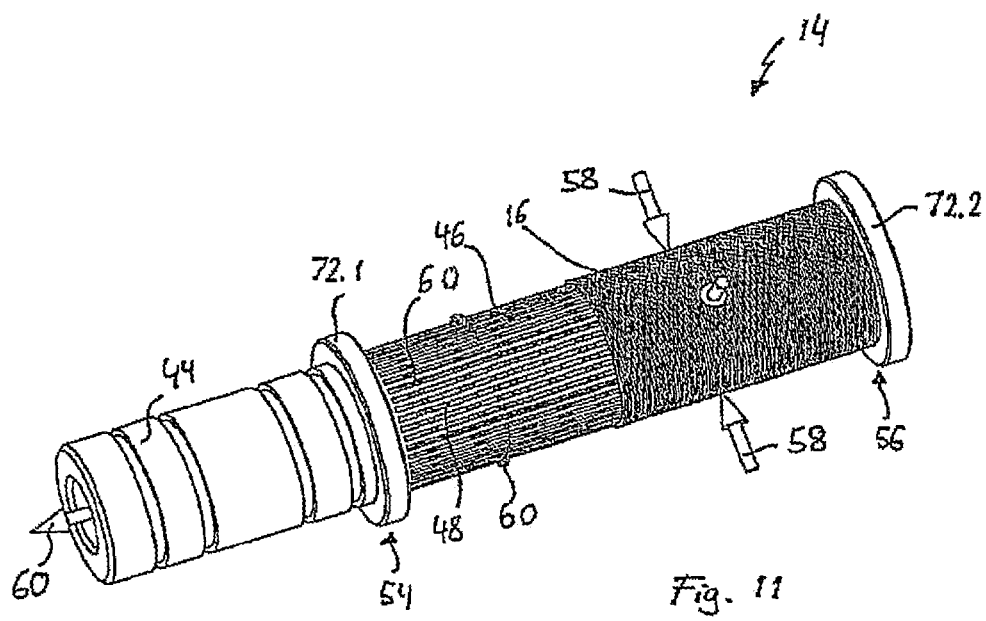
FIG. 11: the filter element according to FIG. 10a, partially enclosed with filter material.

FIG. 11 shows the filter element according to FIG. 10a, now enclosed partially with a filter material 16 in the form of a textured yarn. Here, the arrows 58 illustrate the feeding of a medium to be cleaned, which penetrates through the filter material 16, and which is fed cleaned, as filtrate 60, illustrated by the arrows 60, through the recesses 48 to the openings 52, and finally it leaves the cylindrical filter element 14 via the opening of the outlet 44.

The filter element 14 according to FIGS. 10a and 11 is here designed to be open on one side. However, it is also entirely possible for the cylindrically designed filter element to present two outlets 44, which are arranged on the opposite head areas 54 and foot areas 56, so that the cleaned filtrate 60 can leave the filter element 14 on both front sides.

Figure 12:
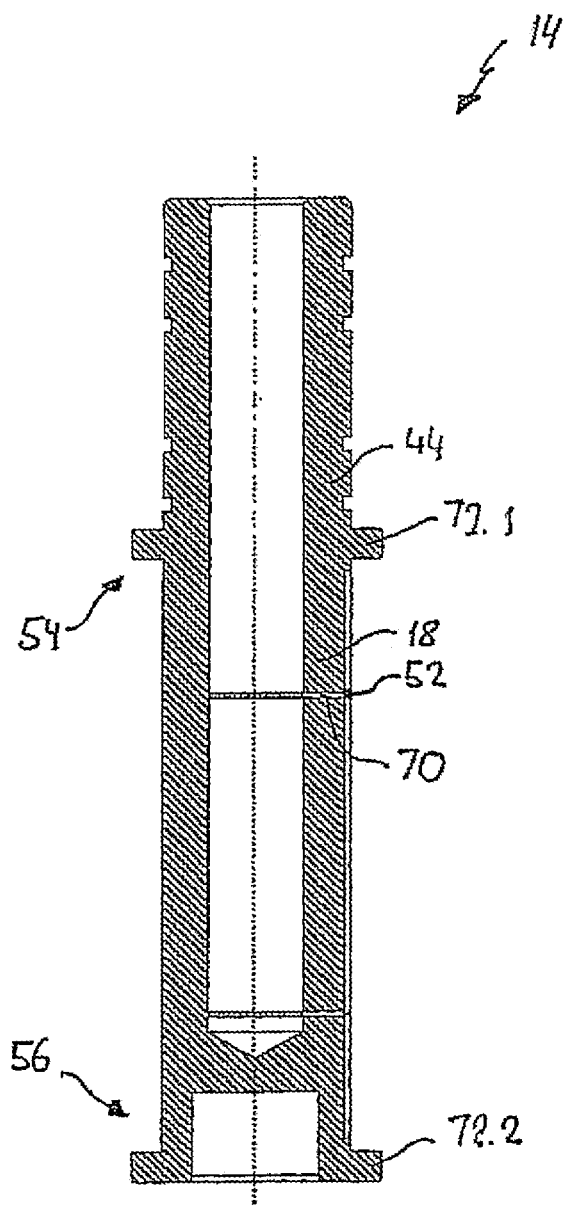
FIG. 12: a cylindrically designed filter element in a cross-sectional view without filter material.

FIG. 12 shows the cylindrical filter element 14 according to FIGS. 10a and 11 in a cross-sectional view, where the openings 52 with their associated opening channels 70 can be seen particularly clearly. The rebound element 18 here consists of a hollow body formed from a metal and/or plastic material. In the foot area 56, the filter element 14 is closed, and, on the head area, 54, the outlet 44 is arranged connected to the flange 72.1 located there.

Figure 13:
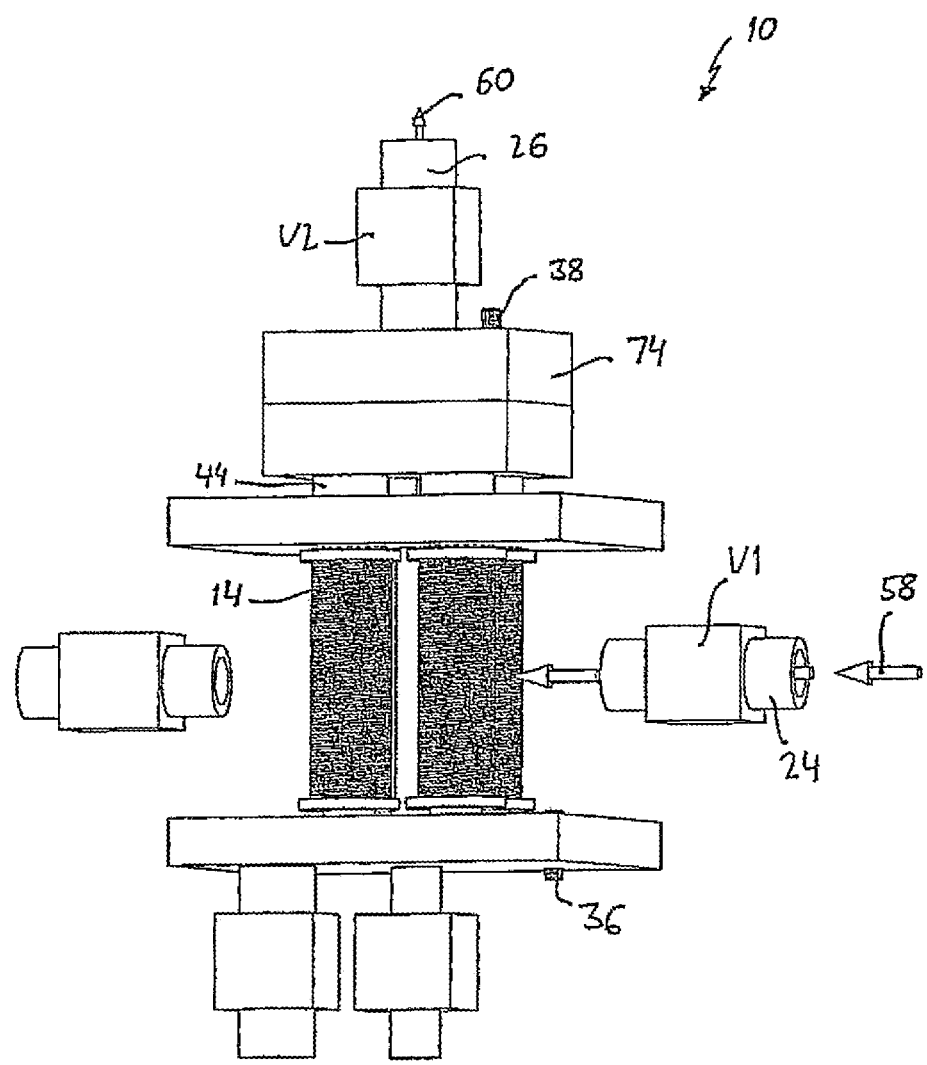
FIG. 13: a partially broken open perspective view of the filtering device according to FIG. 9 for explanation of the filtering process.
Figure 14:
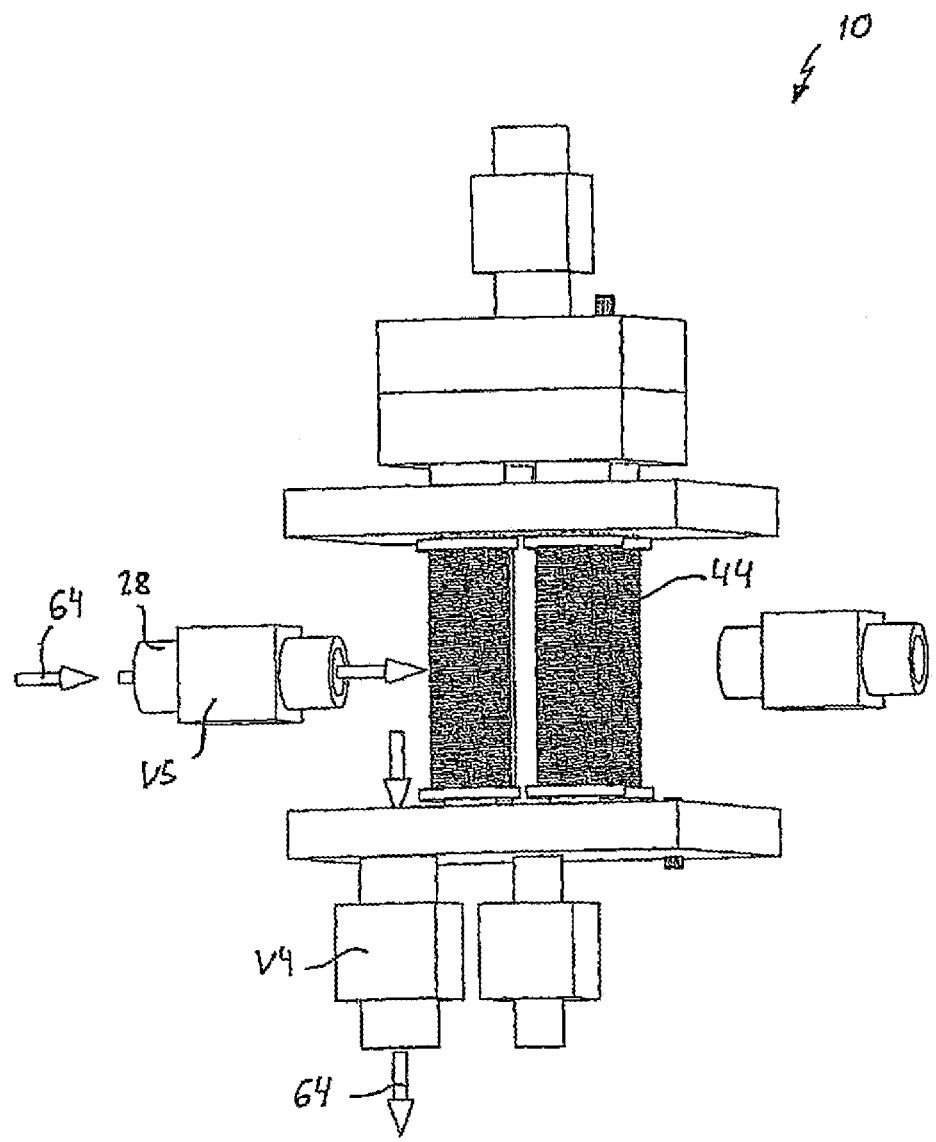
FIG. 14: a partially broken open view of the filtering device according to FIG. 9 for illustrating preliminary cleaning.
Figure 15:
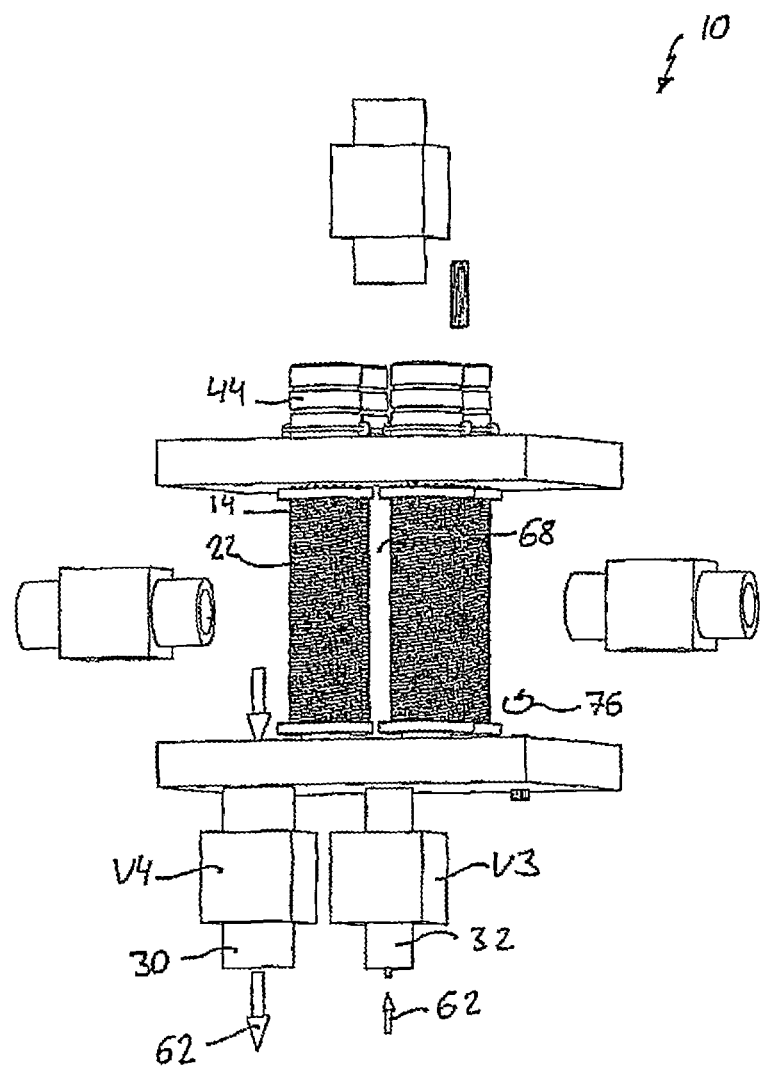
FIG. 15: the [sic] a partially broken open view of the filtering device according to FIG. 9 for facilitating cleaning of the same.

FIGS. 13-15 now show the individual filtration, preliminary cleaning and cleaning steps, where the filtration step and the preliminary cleaning step are carried out accordingly with the device shown in FIG. 1a. The medium to be cleaned 58 passes through the inlet 24, which is regulated by the valve V1, into the interior of the filtering device 10, it penetrates through the filter material of the total of four filter elements 14 that are arranged so they face each other in an approximately square base area, is transferred via the openings 52, which are not shown in greater detail in FIG. 13 (see FIGS. 10-12), as cleaned filtrate, into the interior of the filter elements 14, the filtrate 60 is finally cleaned in the joining element 74, and is removed through the common outlet 26 following the valve V2 of the device 10. If the pressure difference that is measured by the pressure sensors 36 and 38 now becomes so large that a predetermined target value is exceeded, the valves V1 and V2 are closed, and the preliminary cleaning or cleaning of the device 10 is set in motion; however, the process can also be started at any time with/without existing pressure difference. Naturally, it is also possible to provide more than or fewer than four filter elements 14.

FIG. 14 shows the preliminary cleaning step, where a preliminary cleaning medium 64 is fed via the feed 28, which is regulated by the valve V5, to the device 10, while being preferably gaseous and under pressure, which results in any filtrate 60 or medium to be cleaned 58 that is still present in the interior of the device 10 being released via the outlet 64 [sic; 44], which is regulated by the valve V4, out of the device 10. After a predetermined time period, the feed of the preliminary cleaning medium 64 is then interrupted by closing the valve V5, and the cleaning proper is set in motion.

FIG. 15 shows the cleaning of the device 10, where the cleaning medium 62 is fed via the feed 32, which is regulated by the valve V3, to a nozzle block 68 with nozzle rows 22. The nozzle block 68 here presents a cylindrical design, and it presents at least one nozzle row 22 associated or corresponds with each of the four filter elements 14, i.e., a total of at least four. The individual nozzles of the nozzle row 22 can here apply the cleaning medium 62 perpendicularly and/or angularly on the surface of the filter element 14. The cleaning element 62 penetrates through the filter material 16 which at least partially covers the rebound element 18, it penetrates again through the filter material 16 of the filter elements 14, and it is subsequently removed again via the outlet 30, which is regulated via the valve V4, out of the device 10. Here, one provides for the nozzle block 68 to present a stationary design, and for the filter elements 14 to be movable, which is illustrated by the arrow 76. The filter elements 14 here rotate about their main axis, so that the total surface of the filter elements 14 can be imbued uniformly by the cleaning medium 62 that flows out of the nozzle row 22, and the cleaning medium 62 can also be reflected correspondingly on the rebound element 18 of the filter elements 14 by the rebound element 18, and again penetrate through the filter material 16 of the filter elements 14. After a predetermined time span, the rotation of the filter element 14 is then stopped, and the valve V3 and the valve V4 are closed. Then the device 10 is again available for cleaning a medium 58 to be cleaned. Optionally one can, before feeding the medium 58 to be cleaned (see FIG. 13), reapply preliminary cleaning medium, particularly gaseous or liquid, according to FIG. 14, to displace residues of the cleaning medium 62 from the device 10.

The work procedure of the device according to the invention that is described above in reference to FIGS. 13-15 and to the description, is then continued in a new cycle.

By means of the filtering device according to the invention, the filter element according to the invention, and the method according to the invention, an effective filtration of the cleaning medium is achieved, regardless of whether it is liquid and/or gaseous, as well as an effective cleaning by providing rebound elements.

It is claimed:

1. A filtering device comprising:
    a housing defining a filtration flowpath, the housing having at least one inlet and at least one outlet through which a filtrate flows,
    at least one cylindrical filter element arranged within the housing, the at least one cylindrical filter element having at least one filter material and at least one rebound element, the at least one rebound element having a first flange extending from a head region and a second flange extending from a foot region, the at least one rebound element having a structured surface with at least two recesses mutually parallel in the longitudinal direction of the rebound element, the at least two recesses are formed extending between the first flange and the second flange, the at least one rebound element having at least one opening through which the filtrate flows into an interior of the at least one rebound element, the at least one opening is arranged on the structured surface of the at least one rebound element adjacent one of the head region and the foot region in an area of extension of at least one of the at least two recesses, where the at least one rebound element is at least partially covered with the at least one filter material, and
    a cleaning device, having at least one nozzle that corresponds with each individual at least one filter element accommodated in the housing, the at least one nozzle which can be directed, for the removal of a filter cake on the at least one filter material by means of a cleaning medium, perpendicularly and/or angularly in relation to the filter element to which the at least one nozzle corresponds, where the cleaning medium at least partially penetrates the filter material, and the rebound element deflects the cleaning medium at least partially for a renewed passage through the filter material with at least partial removal of the filter cake at the same time, and where the filter element is designed to be moveable.

2. The filtering device according to claim 1, wherein the filter material is chosen from a group comprising nonwovens, fabrics, fibers, yarns and/or sintered metal bodies.

3. The filtering device according to claim 1, wherein the nozzle is designed at an angle of 5 to 85 degrees, with respect to a surface of the rebound element.

4. A cylindrical filter element for a filtering device having a housing that defines a filtration flowpath through which a filtrate flows, the housing having at least one inlet and at least one outlet, the cylindrical filter element comprising:
    at least one rebound element having a first flange extending from a head region and a second flange extending from a foot region, the at least one rebound element having a structured surface with at least two recesses mutually parallel in the longitudinal direction of the rebound element, the at least two recesses are formed extending between the first flange and the second flange, the at least one rebound element having at least one opening through which the filtrate flows into an interior of the at least one rebound element, the at least one opening is arranged on the structured surface of the at least one rebound element adjacent one of the head region and the foot region in an area of extension of at least one of the at least two recesses, and at least one filter material that at least partially covers the rebound element, and the filter material is a yarn, which consists of one or more individual filaments, and which is formed into at least two layers.

* * * * *

UNITED STATES PATENT AND TRADEMARK OFFICE
CERTIFICATE OF CORRECTION

| | | |
|---|---|---|
| PATENT NO. | : 8,777,018 B2 | Page 1 of 1 |
| APPLICATION NO. | : 12/430531 | |
| DATED | : July 15, 2014 | |
| INVENTOR(S) | : Harald Schmidt et al. | |

It is certified that error appears in the above-identified patent and that said Letters Patent is hereby corrected as shown below:

Title Page: Item (30) Foreign Application Priority Data

Delete "10 2006 050 127", Insert --10 2006 050 127.6--

Signed and Sealed this
Nineteenth Day of May, 2015

Michelle K. Lee
*Director of the United States Patent and Trademark Office*